United States Patent
Jing et al.

(10) Patent No.: US 12,486,373 B2
(45) Date of Patent: Dec. 2, 2025

(54) HARDCOAT COMPOSITION COMPRISING METHYL OR ETHYL TRIALKOXY SILANE, ARTICLES AND METHODS

(71) Applicant: 3M INNOVATIVE PROPERTIES COMPANY, St. Paul, MN (US)

(72) Inventors: Naiyong Jing, St. Paul, MN (US); Xue Tian, Woodbury, MN (US); Jun Ma, Woodbury, MN (US); Jordan C. DuCharme, Apple Valley, MN (US); Gezahegn D. Damte, Cottage Grove, MN (US); Xi Chen, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/026,268

(22) PCT Filed: Sep. 23, 2021

(86) PCT No.: PCT/IB2021/058699
§ 371 (c)(1),
(2) Date: Mar. 14, 2023

(87) PCT Pub. No.: WO2022/074495
PCT Pub. Date: Apr. 14, 2022

(65) Prior Publication Data
US 2023/0357520 A1    Nov. 9, 2023

Related U.S. Application Data

(60) Provisional application No. 63/089,038, filed on Oct. 8, 2020.

(51) Int. Cl.
*C08J 7/06*    (2006.01)
*C08G 77/18*   (2006.01)
(Continued)

(52) U.S. Cl.
CPC .............. *C08J 7/06* (2013.01); *C08G 77/18* (2013.01); *C08J 7/056* (2020.01); *C08K 3/36* (2013.01);
(Continued)

(58) Field of Classification Search
CPC ............ C08Z 7/06; C09D 7/61; C09D 183/06
See application file for complete search history.

(56) References Cited

U.S. PATENT DOCUMENTS 2,601,123 A    6/1952  Moulton
3,986,997 A   10/1976  Clark
(Continued)

FOREIGN PATENT DOCUMENTS

EP    0658525 B1    2/2000
EP    3321096 A1    5/2018
(Continued)

OTHER PUBLICATIONS

Chantarachindawong, "Development of The Scratch Resistance on Acrylic Sheet with Basic Colloidal Silica (SIO2)—Methyltrimethoxysilane (MTMS) Nanocomposite Films by Sol-Gel Technique" The Canadian Journal of Chemical Engineering, Aug. 2012, vol. 90, pp. 888-896.

(Continued)

*Primary Examiner* — Robert A Vetere
(74) *Attorney, Agent, or Firm* — Carolyn A. Fischer

(57) ABSTRACT

Articles are described comprising a substrate and a hardcoat layer disposed on the substrate. The hardcoat layer comprises the hydrolyzed and condensed reaction product of a composition comprising: i) first hydrophobic silane monomer(s) having the formula $R^1Si(OR)_3$ wherein R and $R^1$ is methyl or ethyl; ii) optional second silane monomer(s) having the formula $(R^2)_{4-m}Si(OR)_m$ or $Si(OR)_4$, wherein R, $R^1$ and $R^2$ are organic groups with the proviso that $R^1$ is not (Continued)

methyl or ethyl and m ranges from 1 to 3. The hardcoat layer may further comprises 10 to 30 wt. % silica nanoparticles. A surface layer comprising a hydrophilic silane may be disposed on the hardcoat layer. Also described is a method of using an article having a rewritable surface, hardcoat coating compositions, and methods of making hardcoat compositions and articles.

22 Claims, 1 Drawing Sheet

(51) Int. Cl.
    *C08J 7/056*     (2020.01)
    *C08K 3/36*     (2006.01)
    *C08K 5/541*     (2006.01)
    *C09D 7/61*     (2018.01)
    *C09D 183/06*     (2006.01)

(52) U.S. Cl.
    CPC ............... *C08K 5/541* (2013.01); *C09D 7/61* (2018.01); *C09D 183/06* (2013.01); *C08J 2367/02* (2013.01)

(56) References Cited

U.S. PATENT DOCUMENTS

| | | | |
|---|---|---|---|
| 4,152,165 | A | 5/1979 | Langager et al. |
| 4,177,315 | A | 12/1979 | Ubersax |
| 4,198,539 | A | 4/1980 | Pepper, Jr. |
| 4,293,734 | A | 10/1981 | Pepper, Jr. |
| 4,338,377 | A | 7/1982 | Beck et al. |
| 4,371,746 | A | 2/1983 | Pepper, Jr. |
| 4,734,295 | A | 3/1988 | Liu |
| 5,189,337 | A | 2/1993 | Endo et al. |
| 5,639,517 | A | 6/1997 | Floch et al. |
| 5,698,266 | A | 12/1997 | Floch et al. |
| 5,725,957 | A | 3/1998 | Varaprasad et al. |
| 5,742,118 | A | 4/1998 | Endo et al. |
| 5,936,703 | A | 8/1999 | Miyazaki et al. |
| 5,998,013 | A | 12/1999 | Shoshi et al. |
| 6,040,053 | A | 3/2000 | Scholz et al. |
| 6,106,892 | A | 8/2000 | Ye |
| 6,248,397 | B1 | 6/2001 | Ye |
| 6,280,552 | B1 | 8/2001 | Bottari |
| 6,406,758 | B1 | 6/2002 | Bottari et al. |
| 6,504,582 | B1 | 1/2003 | Li et al. |
| 6,504,583 | B2 | 1/2003 | Li et al. |
| 6,649,266 | B1 | 11/2003 | Gross et al. |
| 6,727,895 | B2 | 4/2004 | Bottari et al. |
| 7,234,816 | B2 | 6/2007 | Bruzzone et al. |
| 7,291,386 | B2 | 11/2007 | Richter et al. |
| 9,227,459 | B2 | 1/2016 | Goscha et al. |
| 9,493,029 | B2 | 11/2016 | Nachtman et al. |
| 9,493,675 | B2 | 11/2016 | Nachtman et al. |
| 9,527,336 | B2 | 12/2016 | Mahli et al. |
| 9,969,907 | B2 | 5/2018 | Hatlewick et al. |
| 10,103,048 | B2 | 10/2018 | Flaim et al. |
| 10,316,212 | B2 | 6/2019 | Jing et al. |
| 10,529,924 | B2 | 1/2020 | Yu et al. |
| 10,710,343 | B2 | 7/2020 | Johnson et al. |
| 2004/0027339 | A1 | 2/2004 | Schulz |
| 2004/0040645 | A1 | 3/2004 | Bottari |
| 2004/0071986 | A1 | 4/2004 | Shoshi et al. |
| 2006/0046078 | A1 | 3/2006 | Richter et al. |
| 2012/0058333 | A1 | 3/2012 | Yamamoto et al. |
| 2013/0029311 | A1 | 1/2013 | Goscha |
| 2016/0340550 | A1 | 11/2016 | Tsukamoto |
| 2018/0148600 | A1 | 5/2018 | Murugesan et al. |
| 2018/0258312 | A1 | 9/2018 | Cordero et al. |
| 2020/0274213 | A1 | 8/2020 | Cho et al. |
| 2021/0371615 | A1* | 12/2021 | Tian ................. C08J 7/046 |
| 2023/0178837 | A1 | 6/2023 | Janarthanam et al. |
| 2023/0357520 | A1 | 11/2023 | Jing et al. |

FOREIGN PATENT DOCUMENTS

| | | | |
|---|---|---|---|
| JP | 2022139546 A | 9/2022 | |
| JP | 2023019789 A | 2/2023 | |
| KR | 20190055178 A | 5/2019 | |
| KR | 102444443 B1 | 9/2022 | |
| WO | 2007146680 A1 | 12/2007 | |
| WO | 2008039680 A1 | 4/2008 | |
| WO | 2009119690 A1 | 10/2009 | |
| WO | 2011163175 A1 | 12/2011 | |
| WO | 2015023372 A1 | 2/2015 | |
| WO | 2015088808 A1 | 6/2015 | |
| WO | WO-2018234916 A1 * | 12/2018 | ............ C08J 7/0423 |
| WO | WO-2020033686 A1 * | 2/2020 | ............. B43L 1/002 |
| WO | 2023198743 A1 | 10/2023 | |
| WO | 2023198747 A1 | 10/2023 | |

OTHER PUBLICATIONS

International Search Report for PCT Application No. PCT/IB2021/058699, mailed on Jan. 3, 2022, 5 pages.
Kawamura, "A New Anti-Static Anti-Reflection Coating for CRTs Using Ultrafine Particles", SID 93 DIGEST, 1993, pp. 209-212.
Kurjata, "Investigation of hydrolysis and condensation of methyltriethoxysilane in aqueous systems", European Journal of Chemistry, 2013, vol. 4, No. 4, pp. 343-349.
Sprung, "The Partial Hydrolysis of Methyltriethoxysilane", Journal of the American Chemical Society, Aug. 1955, vol. 77, pp. 3990-3996.
Widati, "Water-Repellent Glass Coated with Si02-Ti02-Methyltrimethoxysilane Through Sol-Gel Coating", AIMS Materials Science, Jan. 2019, vol. 6, No. 1, pp. 10-24.
Kraton_G1654HPolymer_DataDocument, (2020), 2 pages.
Lyondellbasell, Product Data Sheet, Pro-fax SR549M, (2024), 4 pages.
Specific Polymers, Technical Data Sheet, Poly(NiPAAm) triethoxsilane terminated, Dec. 5, 2024, 2 pages.
Wacker Chemie AG_Polymers for Adhesive and Sealant Manufacture. SMP Overview, Feb. 2023, 2 pages.
Worlée-Chemie GmbH, Product Brochure "Solvent based silane functional polyurethanes for various applications", Apr. 2018, 2 pages.

* cited by examiner

HARDCOAT COMPOSITION COMPRISING METHYL OR ETHYL TRIALKOXY SILANE, ARTICLES AND METHODS

SUMMARY

Articles having rewritable surfaces such as dry erase articles, etc. have been described. (See for example WO2011163175). However there is a continuing need for rewritable writing surfaces that exhibit durable performance and good erasability, especially erasability of permanent marker with water. There is also a continuing need for hardcoat coating compositions having good stability.

In some embodiments, (e.g. dry erase board and anti-fog face shields) articles are described comprising a substrate and a hardcoat layer disposed on the substrate. The hardcoat layer comprises the hydrolyzed and condensed reaction product of a composition comprising: i) first hydrophobic silane monomer(s) having the formula $R^1Si(OR)_3$ wherein R and $R^1$ is methyl or ethyl; ii) optional second silane monomer(s) having the formula $(R^2)_{4-m}Si(OR)_m$ or $Si(OR)_4$, wherein R, $R^1$ and $R^2$ are organic groups with the proviso that $R^1$ is not methyl or ethyl and m ranges from 1 to 3. When present, the second silane monomer(s) is present in an amount less than 20 wt. % based on the sum of first and second silane monomers. The hardcoat layer preferably further comprises 10 to 30 wt. % silica nanoparticles. In some favored embodiments, a surface layer comprising a hydrophilic silane, such as a zwitterionic silane, is disposed on the hardcoat layer.

Also described is a method of using an article having a rewritable surface, hardcoat coating compositions, and methods of making hardcoat compositions and articles.

DETAILED DESCRIPTION OF ILLUSTRATIVE EMBODIMENTS

Figure 1:
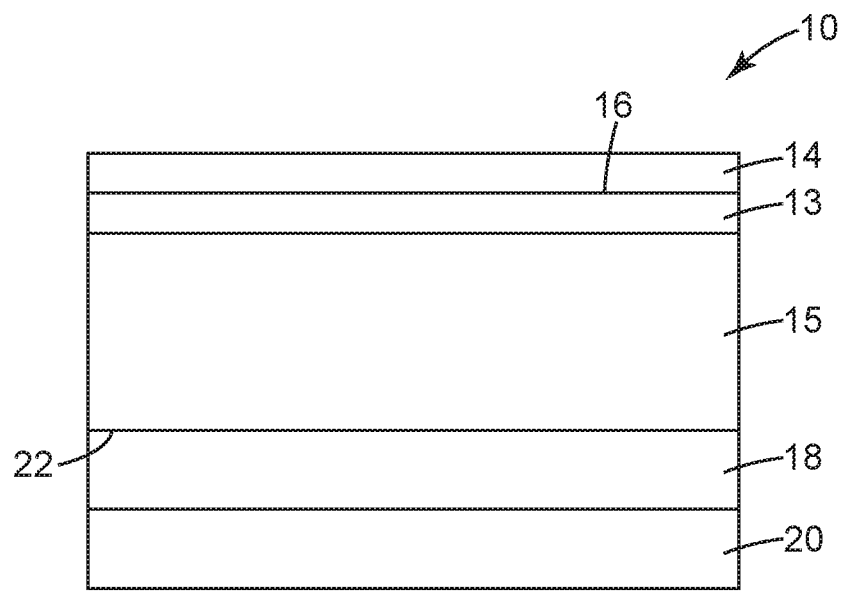
FIG. 1 is a cross-section schematic of an illustrative article comprising a hydrolyzed and condensed hardcoat layer disposed on a substrate, a surface layer comprising a hydrophilic silane disposed on the hardcoat layer, and other optional layers.

In one embodiment, a hardcoat coating composition is described. The hardcoat coating composition comprises first silane monomer(s) having the formula $R^1Si(OR)_3$ wherein R and $R^1$ is methyl or ethyl. Thus, the first hydrophobic silane monomer is methyltrimethoxysilane, ethyltrimethoxysilane, methyltriethoxysilane, ethyltriethoxy silane, and combination thereof. In some embodiments, the first hydrophobic silane is methyltrimethoxysilane, methyltriethoxysilane, or a combination thereof. The categorization of an alkoxy silane monomer as hydrophobic or hydrophilic is typically made on the basis of the $R^1$ group. Alkoxy silane monomers wherein $R^1$ is alkyl are considered hydrophobic.

In some embodiments, the hardcoat composition comprises first silane monomer(s) as just described and second silane monomer(s) having the formula $(R^2)_{4-m}Si(OR)_m$ or $Si(OR)_4$, wherein R and $R^2$ are organic groups with the proviso that $R^2$ is not methyl or ethyl and m is 1, 2 or 3 and more typically is 2 or 3.

Thus, the second silane monomers are different silane monomer than the first silane monomers. In some embodiments, the second silane monomers are also hydrophobic, such as in the case when $R^2$ is a hydrocarbon group having at least 3, 4, 5, 6, 7, 8, 9, 10, 11 or 12 carbon atoms. In some embodiments, $R^2$ is no greater than 30, 28, 26, 24, 22, or 20 carbon atoms. The $R^2$ may be a straight-chain, branched, or cyclic. Typically, $R^2$ is aliphatic such as in the case of alkyl, alkenyl, alkynyl. The aliphatic group may optionally comprise heteroatoms (e.g. oxygen, nitrogen, or sulfur). Alternatively, $R^2$ may comprise an aromatic group.

Representative second monomers include for example propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane dimethyldimethoxysilane and dimethyldiethoxysilane.

In some embodiments, the second monomer is $(R^2)_{4-m}Si(OR)_m$ wherein R and m are as previously described and $R^2$ comprises a group that reacts with hydroxyl, such as an epoxy silane. Suitable epoxy silanes for use herein include, but are not limited to, 2-(3,4-epoxycyclohexyl) ethyltrimethoxysilane; 2-(3,4-epoxycyclohexyl) ethyltriethoxysilane; (3-glycidoxypropyl) trimethoxysilane; (3-glycidoxypropyl) triethoxysilane; and mixtures thereof.

In some embodiment, the second monomer is $Si(OR)_4$, a tetraalkoxysilanes, such as tetraethylorthosilicate ("TEOS"), and oligomeric forms of tetraalkoxysilane.

When second monomer(s) are present, the weight ratio of first silane monomer(s) to second silane monomer(s) is at least 4:1. In typical embodiments, the weight ratio of first silane monomer(s) to second silane monomer(s) is at least 5:1, 6:1, 7:1, 8:1, or 9:1. In other words, the first silane monomer(s) are at least 80, 81, 82, 83, 84, 85, 86, 87, 88, 90, 91, 92, 93, 94, 95, 96, 97, 98, 99, or 100 wt. % of the sum of the first silane monomer(s) and second silane monomer(s). Thus, the second silane monomer(s) are no greater than 20 wt. % of the sum of the first silane monomer(s) and second silane monomer(s). In some embodiments, the total amount of second silane monomer(s) is no greater than 19, 18, 17, 16, 15, 14, 13, 12, 11, 10, 9, 8, 7, 6, 5, 4, 3, 2, or 1 wt. % of the sum of the first silane monomer(s) and second silane monomer(s).

The hardcoat composition optionally, but preferably further comprises silica nanoparticles. The inclusion of the silica nanoparticles can improve the durability and increase the pencil hardness relative to the same hardcoat without silica nanoparticles. Nanoparticles have an average primary particle sizes less than 1 micron. In typical embodiments, the silica nanoparticles have an average primary particle diameter of no greater than 750, 500, 250, 200, 150, or 100 nm. In favored embodiments, the silica nanoparticles have an average primary particle diameter of no greater than 75, 50, 25, 20, 15, or 10 nm. The term "primary particle size" refers to the average size of unagglomerated single particles of silica. The average particle size may be determined using transmission electron microscopy. The silica particles may be spherical or non-spherical and are typically discreet particles, rather than aggregates.

The silica particles typically have narrow particle size distributions, that is, a polydispersity (i.e., particle size distribution) of 2.0 or less, preferably 1.5 or less. If desired, larger silica particles may be added, provided that the presence of the larger particles does not decrease the coatability of the hardcoat composition or decrease the hardcoat coating composition stability.

In some embodiments, the silica nanoparticles are not surface modified. Smaller nanoparticles, those having an average particle size of less than 20, 15, or 10 nanometers can be utilized to prepare hardcoat composition having good stability and durability without being surface modified. Larger silica nanoparticles, i.e. 20 nm or greater preferably comprise a surface treatment.

In some embodiments, the silica nanoparticles are surface modified with the first or second silane monomer as previously described. In some embodiments, the surface treatment comprises the second monomer with R comprises an epoxy group. In other embodiments, the surface treatment comprises the second monomer with R comprises an amine group, as described in WO2015/088808; incorporated herein by reference.

The method of making the hardcoat coating composition generally comprises i) combining the previously described first hydrophobic silane monomer(s) and optional second silane monomer(s) in an aqueous solution; ii) adding 10 to 30 wt. % of silica nanoparticles to the aqueous solution; iii) preferably adding 10 to 30 wt. % of silica nanoparticles to the aqueous solution; and hydrolyzing and condensing first hydrophobic silane monomer(s) and optional second silane monomer(s) thereby forming a polysiloxane continuous network. In some embodiments, steps iii) and iv) occur prior to step ii).

The aqueous solution comprises water and preferably a high boiling point organic solvent, such as 1-methoxy-2-propanol. The boiling point of the solvent is typically at least 80, 90, 100, 110, or 120° C. In the absence such solvent the cured coating surface is non-uniform, typically being uneven in thickness and exhibiting other coating defects.

In some embodiments, non-aqueous silica sols (also called silica organosols), wherein the liquid phase is predominantly organic solvent, may be used in the method of making the hardcoat composition. However, in typical embodiments, the silica nanoparticles utilized in the method are dispersions of submicron size silica nanoparticles in an aqueous liquid phase optionally comprising organic solvent mixture. Inorganic silica sols in aqueous media are well known in the art and commercially available. Silica sols in water or water-alcohol solutions are available commercially under such trade names NALCO from Nalco Water, Naperville, IL. One useful silica sol is NALCO™ 1130, silica sol with mean particle size of 8 nanometers, pH 10.5, and solid content 30% by weight. Other commercially available silica nanoparticles suitable for use in the present invention include NALCO™ 1115, NALCO™ 2326, NALCO™ 2327, and NALCO™ 2329. The hardcoat coating composition generally contains sufficient acid to provide a pH of less than 6 or 5. In some embodiments, it has been found that the pH of the coating composition can be adjusted to pH from 5 to 6 after reducing the pH to less than 5. This allows one to coat pH-sensitive substrates. Sodium stabilized silica nanoparticles are typically first be acidified prior to dilution with an organic solvent such as ethanol. Dilution prior to acidification may yield poor or non-uniform coatings. Ammonium stabilized silica nanoparticles may generally be diluted and acidified in any order.

The hardcoat coating composition typically contains a (e.g. weaker) acid having a pKa of >4, such as acetic acid. In some embodiments, the hardcoat coating composition typically contains a (e.g. weaker) acid having a pKa of >4 in combination with a stronger acid having a pKa ($H_2O$) of ≤3.5, <2.5, or less than 1. Useful acids include both organic and inorganic acids and may be exemplified by oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3SO_2OH$. A mixture of an organic and inorganic acid can be utilized. Is some embodiments, the weight ratio of stronger acid (e.g. nitric acid) to weaker acid (e.g. acetic acid) is less than 5:1, 4:1, 3:1, 2:1, or 1:1.

The acidified silica nanoparticle hardcoat coating compositions can be coated directly onto hydrophobic organic and inorganic substrates without either organic solvents or surfactants. The wetting property of these inorganic nanoparticle aqueous dispersions on hydrophobic surfaces such as polyethylene terephthalate ("PET") or polycarbonate ("PC") is a function of the pH of the dispersions and the pKa of the acid. Hardcoat coating compositions typically bead up (i.e. dewet) on the organic substrates at neutral or basic pH.

The hydrolyzed and condensed hardcoat composition typically comprises silica nanoparticles dispersed in a continuous gelled polysiloxane network. As used herein, the term "continuous" refers to covering the surface of the substrate with virtually no discontinuities or gaps in the areas where the hydrolyzed and condensed hardcoat composition was applied.

In order to uniformly coat a hardcoat composition onto a hydrophobic substrate from an aqueous system it may be desirable to increase the surface energy of the substrate and/or reduce the surface tension of the coating composition. The surface energy may be increased by oxidizing the substrate surface prior to coating using corona discharge, actinic radiation, or flame treatment methods. These methods may also improve adhesion of the coating to the substrate. Other methods capable of increasing the surface energy of the article include the use of organic polymeric primers such as thin coatings of polyvinylidene chloride (PVDC). Alternatively, the surface tension of the coating composition may be decreased by addition of lower alcohols ($C_1$ to $C_8$). In some embodiments, it may be beneficial to add a wetting agent, such as a surfactant, to the hardcoat composition.

The term "surfactant" as used herein describes molecules comprising hydrophilic (polar) and hydrophobic (non-polar) regions on the same molecule which are capable of reducing the surface tension of the coating solution. Useful surfactants include anionic surfactant, catiionionic surfactants, and non-ionic surfactant such as those described in U.S. Pat. No. 6,040,053 (Scholz et al.) and U.S. Pat. No. 10,316,212 (Jing et al.) incorporated herein by reference; as well as silicone surfactants, such as commercially available as the trade designations BYK-333 from BYK and DOWSIL™ Q2-5211, a silicone polyether copolymer available from Dow.

In some embodiments, a surfactant is included in the hardcoat coating composition at a concentration of at least 0.5, 1, 1.5 or 2 wt. % of the aqueous hardcoat coating composition. In typical embodiments, the amount of surfactant is no greater than 5 wt. %. of the aqueous hardcoat coating composition.

Other useful wetting agents include polyethoxylated alkyl alcohols (e.g., BRIJ™ 30 and BRIJ™ 35 from ICI Americas, Inc., and TERGITOL™ TMN-6™ Specialty Surfactant from Union Carbide Chemical and Plastics Co., polyethoxylated alkylphenols (e.g., TRITON™ X-100 from Union Carbide Chemical and Plastics Co., ICONOL™ NP-70 from BASF Corp.) and polyethylene glycol/polypropylene glycol block copolymer (e.g., TETRONIC™ 1502 Block Copolymer Surfactant, TETRONIC™ 908 Block Copolymer Surfactant, and PLURONIC™ F38 Block Copolymer Surfactant all from BASF, Corp.). When present, such wetting agent(s) are used in amounts of less than 0.1 percent by weight of the coating composition, preferably 0.003 to 0.05 percent by weight of the coating composition depending on the amount of silica nanoparticles. Rinsing or steeping the coated article in water may be desirable to remove excess surfactant or wetting agent.

The hard coat layer alone or in combination with the surface layer comprising a hydrophilic silane may have a gloss or matte surface. Matte surfaces typically have lower transmission and higher haze values than gloss surfaces. For examples the haze is generally at least 5%, 6%, 7%, 8%, 9%, or 10% as measured according to ASTM D1003. Whereas gloss surfaces typically have a gloss of at least 90 or 95 as measured according to ASTM D 2457-03 at 60 degrees; matte surfaces have a gloss of less than 85, 80, 70, 65, 60, 55, 50, 45, or 40. In some embodiments the gloss of the matte surface is at least 20 or 30.

Matte surfaces can conceal defects such as scratches and contaminations such as dirt, stains, fingerprints. Another benefit of having the matte surfaces is that they are more visually attractive. Further, the subtle touch and friction of matte surfaces creates a feeling of writing on conventional paper.

The hard coat layer alone or in combination with the surface layer can be rendered matte using various known techniques. In some embodiments, the surface can be roughened or textured to provide a matte surface by embossing the surface with a suitable tool that has been bead-blasted or otherwise roughened, as well as by curing the composition against a suitable roughened master or removable liner.

In other embodiments, the hard coat composition may comprise a suitably sized matte particles such as silica, glass beads, or organic polymeric beads such as polyethylene (PE), polystyrene (PS), or polymethylmethacrylate (PMMA). In some embodiments, the organic polymeric beads have a density of about 1 g/cm$^3$. (e.g. =+/−0.1 g/cm$^3$). Such matte particles typically have an average particle size ranging from about 1 to 10 microns. In some embodiments, the size of the matte particles is at least 2 or 3 microns and no greater than 4 or 5 microns. Further, the concentration of such matte particles may range from at least 2 wt-% to about 5 wt-% or greater.

With reference to Table 22 of the forthcoming examples, organic polymeric beads can be preferred particles for matte surfaces with respect to erasability. The matte samples that contain larger polymeric beads than the dried and cured hardcoat thickness revealed different level of ghosting that was impossible to remove with water. In contrast, the samples with 3 μm beads resulted clean and easy removal. The amount of ghosting decreases with decreasing average particle size and the ghosting diminished when the matting agent particle size is similar to the thickness of the dried and cured hardcoat. Scanning electron microscopy showed particles that are larger than the hardcoat thickness are exposed in air and not fully covered by the polysiloxane hardcoat. This leads to weak or no binding between the exposed portion and the top silane layer, causing ink directly in contact with polymer beads and thus extremely difficult to remove. When the matte particles have an average particle size of 6 microns and the dried and cured hardcoat has an average thickness of 3 microns; the average particle size is 2 times (i.e. 2×) the average thickness of the dried and cured hardcoat. In favored embodiments, the average particle size of the matte particles is less than 2×, 1.9×, 1.8×, 1.7×, 1.6×, 1.5×, 1.4×, 1.3×, 1.2×, 1.1×, or 1× (in other word about equal) to the average particle size of the matte particles.

The aqueous hardcoat coating compositions described herein and illustrated by the examples are shelf stable for 3 months at room temperature (25 C) or 1 month at 50° C. The aqueous hardcoat coating compositions do not gel, opacify, or otherwise deteriorate significantly.

Hardcoat coating compositions are preferably coated on the article using conventional techniques, such as bar, roll, curtain, rotogravure, spray, or dip coating techniques. In order to ensure uniform coating and wetting of the film, it may be desirable to oxidize the substrate surface prior to coating or increase the surface energy by applying a primer, as previously described. The aqueous hardcoat coating compositions are applied in uniform average thicknesses varying by less than 20 nm and more preferably by less than 10 nm in order to avoid visible interference color variations in the coating.

The hydrolyzed and condensed hardcoat composition typically has an average thickness of at least 1, 2, or 3 microns ranging up to 10 microns. More typically, the thickness of the hydrolyzed and condensed hardcoat composition is no greater than 9, 8, 7, 6, or 5 microns. The mechanical properties of the hardcoat can improve as thickness is increased. However, the flexibility of the hardcoat can also decrease as the thickness increases. The hardcoat thickness can be measured with an ellipsometer such as a Gaertner Scientific Corp. Model No. L115C Ellipsometer.

Hardcoat coatings can be coated on both sides of a substrate if desired. Alternatively (not showns), the hardcoat coatings may be coated on one side of the substrate, as depicted in FIG. 1.

Once coated, the coat substrate is typically dried and thermally cured at temperatures of 90° C. to 150° C. in a recirculating oven. An inert gas may be circulated. The temperature may be increased further to speed the drying process, depending on the substrate.

The hardcoat coating composition itself provides a tough, abrasion resistant layer that protects the substrate from damage from causes such as scratches, abrasion and solvents. Although the hydrolyzed and condensed hardcoat composition alone can provide a rewritable or anti-fog surface, in favored embodiments a surface layer comprising a hydrophilic silane is disposed on the hydrolyzed and condensed hardcoat composition. Advantageously, permanent marker writing and ghosting from dry erase markers is more easily removable with water from the surface layer comprising a hydrophilic silane.

The hydrophilic silane surface layer can be applied in a monolayer thickness and can be as thick as 10 microns. The hydrophilic silane surface layer typically has a thickness no greater 9, 8, 7, 6, 5, 4, 3, 2, or 1 micron.

The vast majority of the —OH groups formed during hydrolysis are crosslinked with the acid of the hardcoat coating composition. However, the cured hardcoat layer can comprise some —OH groups at the surface that can covalently bond with the hydrophilic silane of the surface layer forming siloxane (Si—O—Si) bonds.

In some embodiment, the hydrophilic silane of the surface layer comprises a non-zwitterionic sulfonate-organosilanol compound. Examples include non-zwitterionic sulfonate-organosilanol compounds such as those disclosed in U.S. Pat. No. 4,152,165 (Langager et al.) and U.S. Pat. No. 4,338,377 (Beck et al.).

In some embodiments, the non-zwitterionic sulfonate-organosilanol compounds used in the solutions and compositions of the present invention have the following Formula (I):

$$[(MO)(Q_n)Si(XCH_2SO_3^-)_{3-n}]Y_{2/r}^{+r} \quad (I)$$

wherein:
each Q is independently selected from hydroxyl, alkyl groups containing from 1 to 4 carbon atoms and alkoxy groups containing from 1 to 4 carbon atoms;
M is selected from hydrogen, alkali metals, and organic cations of strong organic bases having an average molecular weight of less than 150 and a pKa of greater than 11;
X is an organic linking group;
Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of less than 150 and a pKa of greater than 11 (e.g., $^+N(CH_3)_4$, $^+N(CH_2CH_3)_4$), provided that M is hydrogen when Y is selected from hydrogen, alkaline earth metals and organic cations of said protonated weak bases;
r is equal to the valence of Y; and
n is 1 or 2.

Preferably, the non-zwitterionic compound of Formula (I) is an alkoxysilane compound (e.g., wherein Q is an alkoxy group containing from 1 to 4 carbon atoms).

The weight percentage of oxygen in these compounds of Formula (I) is at least 30%, and preferably at least 40%. Most preferably it is in the range of 45% to 55%. The weight percentage of silicon in these compounds is no greater than 15%. Each of these percentages is based on the weight of the compound in the water-free acid form.

The organic linking group X of Formula (I) is preferably selected from alkylene groups, cycloalkylene groups, alkyl-substituted cycloalkylene groups, hydroxy-substituted alkylene groups, hydroxy-substituted monooxa alkylene groups, divalent hydrocarbon groups having monooxa backbone substitution, divalent hydrocarbon groups having mono-thia backbone substitution, divalent hydrocarbon groups having monooxa-thia backbone substitution, divalent hydrocarbon groups having dioxo-thia backbone substitution, arylene groups, arylalkylene groups, alkylarylene groups and substituted alkylarylene groups. Most preferably X is selected from alkylene groups, hydroxy-substituted alkylene groups and hydroxy-substituted monooxa alkylene groups.

Suitable examples of non-zwitterionic compounds of Formula (I) are described in U.S. Pat. No. 4,152,165 (Langager et al.) and U.S. Pat. No. 4,338,377 (Beck et al.), and include, for example, the following:

(HO)$_3$Si—CH$_2$CH$_2$CH$_2$—O—CH$_2$—CH(OH)—CH$_2$SO$_3^{31}$ H$^+$;

(HO)$_3$Si—CH$_2$CH(OH)—CH$_2$SO$_3^-$H$^+$;

(HO)$_3$Si—CH$_2$CH$_2$CH$_2$SO$_3^-$H$^+$;

(HO)$_3$Si—C$_6$H$_4$—CH$_2$CH$_2$SO$_3^-$H$^+$;

(HO)$_2$Si—[CH$_2$CH$_2$SO$_3^-$H$^+$]$_2$;

(HO)—Si(CH$_3$)$_2$—CH$_2$CH$_2$SO$_3^-$H$^+$;

(NaO)(HO)$_2$Si—CH$_2$CH$_2$CH$_2$—O—CH$_2$—CH(OH)—CH$_2$SO$_3^-$Na$^+$; and (HO)$_3$Si—CH$_2$CH$_2$SO$_3^-$K$^+$.

In some embodiment, the surface layer comprises a zwitterionic silane. Examples of zwitterionic sulfonate-functional compounds include those disclosed in U.S. Pat. No. 5,936,703 (Miyazaki et al.) and International Publication Nos. WO 2007/146680 and WO 2009/119690.

In some embodiments, the zwitterionic sulfonate-organosilanol compounds have the following Formula (II) wherein:

$$(R^1O)_p—Si(R^2)_q—W—N^+(R^3)(R^4)—(CH_2)_m—SO_3^- \quad (II)$$

wherein:
each $R^1$ is independently a hydrogen, methyl group, or ethyl group;
each $R^2$ is independently a methyl group or an ethyl group;
each $R^3$ and $R^4$ is independently a saturated or unsaturated, straight chain, branched, or cyclic organic group, which may be joined together, optionally with atoms of the group W, to form a ring;
W is an organic linking group;
p and m are integers of 1 to 3;
q is 0 or 1; and
p+q=3.

The organic linking group W of Formula (II) is preferably selected from saturated or unsaturated, straight chain, branched, or cyclic organic groups. The linking group W is preferably an alkylene group, which may include carbonyl groups, urethane groups, urea groups, heteroatoms such as oxygen, nitrogen, and sulfur, and combinations thereof. Examples of suitable linking groups W include alkylene groups, cycloalkylene groups, alkyl-substituted cycloalkylene groups, hydroxy-substituted alkylene groups, hydroxy-substituted monooxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups.

Suitable examples of zwitterionic compounds of Formula (II) are described in U.S. Pat. No. 5,936,703 (Miyazaki et al.) and International Publication Nos. WO 2007/146680 and WO 2009/119690, and include the following zwitterionic functional groups (—W—N$^+$(R$^3$)(R$^4$)—(CH$_2$)$_m$—SO$_3^-$):

Sulfoalkyl imidazolium salts

Sulfoaryl imidazolium salts

-continued

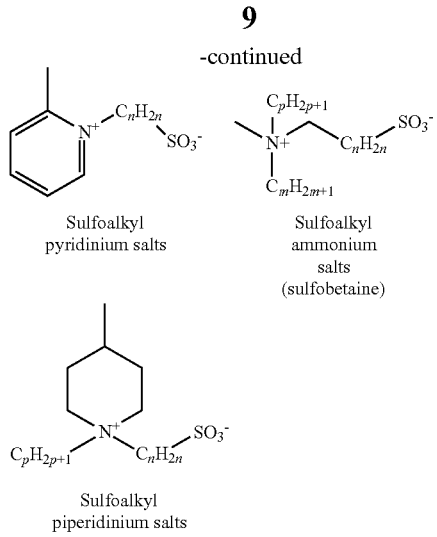

Sulfoalkyl pyridinium salts

Sulfoalkyl ammonium salts (sulfobetaine)

Sulfoalkyl piperidinium salts

In some embodiments, the zwitterionic silane is a sulfonate-organosilanol having the following Formula (III) wherein:

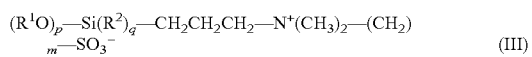

wherein:
each $R^1$ is independently a hydrogen, methyl group, or ethyl group;
each $R^2$ is independently a methyl group or an ethyl group;
p and m are integers of 1 to 3;
q is 0 or 1; and
p+q=3.

Suitable examples of zwitterionic compounds of Formula (III) are described in U.S. Pat. No. 5,936,703 (Miyazaki et al.), including, for example:

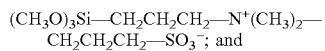

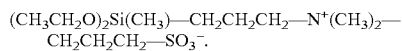

Other examples of suitable zwitterionic compounds include the following:

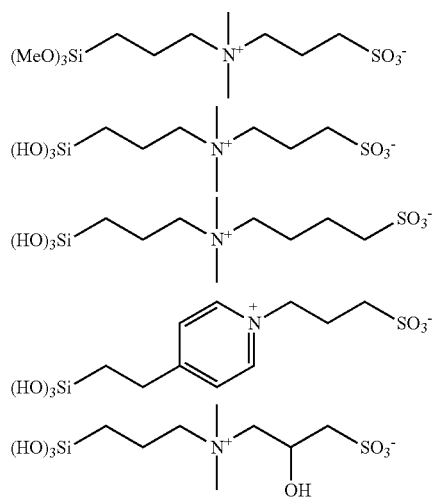

-continued

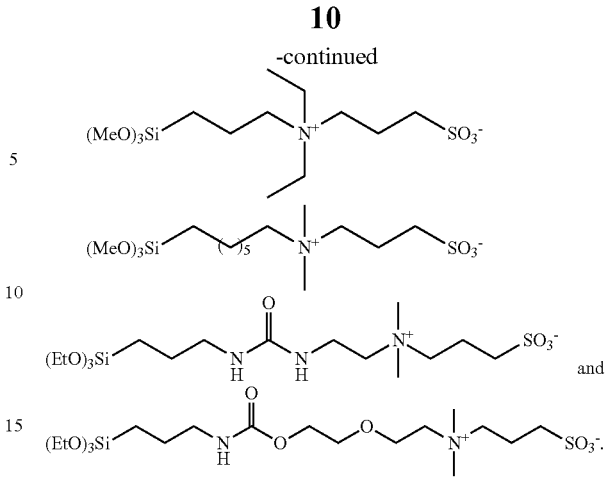

Other suitable hydrophilic functional groups for silanes include but are not limited to phosphonate, carboxylate, gluconamide, sugar, polyvinyl alcohol, and quaternary ammonium.

The aqueous hydrophilic silane coating composition typically includes one or more hydrophilic silane compounds in an amount of at least 0.1, 0.5 or 1 wt. % based on the total weight of the coating solution. The hydrophilic silane coating composition typically includes the hydrophilic silane compound(s) in an amount of no greater than 10, 9, 8, 7, 6, or 5 wt. %, based on the total weight of the coating composition. Generally, for monolayer coating thicknesses, relatively dilute coating compositions are used. In some embodiments, more concentrated coating compositions can be used, In some embodiments, the surface may be subsequently rinsed to remove excess hydrophilic silane.

The hydrophilic silane coating composition preferably includes alcohol, water, or hydroalcoholic solutions (i.e., alcohol and/or water). Typically, such alcohols are lower alcohols (e.g., $C_1$ to $C_8$ alcohols, and more typically $C_1$ to $C_4$ alcohols), such as methanol, ethanol, propanol, 2-propanol, etc. Preferably, the hydrophilic-functional coating compositions are aqueous solutions. As it is used herein, the term "aqueous solution" refers to solutions containing 50 wt-% or greater water. Such solutions may employ water as the only solvent or they may employ combinations of water and organic solvents such as alcohol and acetone. Organic solvents may also be included in the hydrophilic treatment compositions so as to improve their freeze-thaw stability. Typically, the hydrophilic silane coating composition is dilute comprising at least 90 wt. % aqueous solution.

The hydrophilic silane coating composition can be acidic, basic, or neutral. The hydrophilic silane coating composition can optionally comprise surfactant and wetting agents as previously described.

In some embodiments, the hydrophilic silane coating composition optionally further comprise tetraalkoxysilane (e.g., tetraethylorthosilicate ("TEOS")), oligomers thereof; and/or silicates such as alkyl polysilicates (e.g., poly(diethoxysiloxane)), lithium silicate, sodium silicate, potassium silicate, or combinations thereof, that can provide enhanced durability.

When present, such components are typically present in amounts less than the hydrophilic zwitterionic silane(s) or non-zwitterionic silane(s) previously described. In some embodiments, the weight ratio of hydrophilic (e.g. zwitterionic silane(s) or non-zwitterionic silane(s)) to silicate(s) is at least 1:1, 2:1, or 3:1.

The hydrophilic silane coating can optionally comprise water soluble polymers with hydroxyl groups. In the presence of acid, the hydroxyl groups on these polymers can condense to form a water insoluble coating. The hydroxyl groups can also react with silanol groups on a silica nanoparticle hardcoat. Suitable hydrophilic polymers with hydroxy groups include but are not limited to polyvinyl alcohol, hydroxy methyl cellulose, hydroxyethyl cellulose, dextran, guar gum and mixtures thereof. When present, such water soluble polymers with hydroxyl groups are typically present in amounts less than the hydrophilic zwitterionic silane(s) or non-zwitterionic silane(s), as previously described.

The hydrophilic silane coating compositions typically contain at least 50, 55, 60, 65, 70, 75, 80, 85, 90, 95, or 100 wt. % solids of hydrophilic zwitterionic silane(s) or non-zwitterionic silane(s), as previously described.

Hydrophilic silane coating compositions can be coated onto the cured hardcoat layer using conventional techniques, such as bar, roll, curtain, rotogravure, spray, wipe or dip coating techniques. The preferred methods include spray, bar and roll coating.

Once coated, the hydrophilic-functional article is typically dried at temperatures of 30° C. to 200° C. in a recirculating oven. An inert gas may be circulated. The temperature may be increased further to speed the drying process, depending on the heat tolerance of the substrate. Drying drives a condensation reaction between the hydrophilic coating and —OH groups on the surface of the hardcoat layer.

Figure 2:
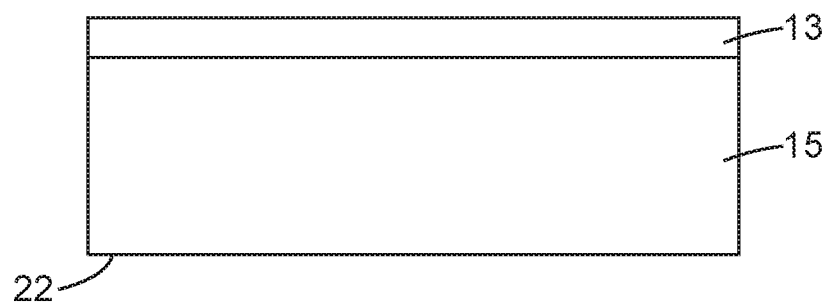
FIG. 2 is a cross-section schematic of an illustrative article comprising a hydrolyzed and condensed hardcoat layer disposed on a substrate.

With reference to FIG. 2, the articles describes herein comprise a hardcoat layer 13, as previously described, disposed on a surface of a substrate 15. Substrates for dry erase surfaces can include for example glass, porcelain steel, painted steel, painted metal, painted hardboard, melamine, coated film, coated paper, and coated fiberboard sheets. In typical embodiments, the substrate comprises an organic polymeric material. The organic polymeric substrates may comprise polymeric sheets, films, or molded materials.

In some favored embodiments, with reference to FIG. 1 the articles describes herein comprise a hardcoat layer 13, as previously described, disposed on a surface of a substrate 15; and a surface layer 14 disposed on major surface 16 of the hydrolyzed and cured hardcoat layer.

The hardcoat together with the hydrophilic surface layer increases the hydrophilicity of the substrate. As used herein, "hydrophilic" is used to refer to a surface that it is wet by aqueous solutions, and does not express whether or not the layer absorbs aqueous solutions. Surfaces on which drops of water or aqueous solutions exhibit a static water contact angle of less than 50° are referred to as "hydrophilic." Hydrophobic substrates have a water contact angle of 50° or greater.

In some embodiments, substrates of rewritable or anti-fog articles may be transparent or translucent to visible light. The term transparent means transmitting at least about 85% of incident light in the visible spectrum (about 400 to about 700 nm wavelength).

Substrates used herein may be flexible or inflexible as desired. Illustrative examples of suitable substrates include polyester (e.g., polyethylene terephthalate, polybutyleneterephthalate), polycarbonate, allyldiglycolcarbonate, polyacrylates, such as polymethylmethacrylate, polystyrene, polysulfone, polyethersulfone, homo-epoxy polymers, epoxy addition polymers with polydiamines, polydithiols, polyethylene copolymers, fluorinated surfaces, cellulose esters such as acetate and butyrate, glass, ceramic, porcelain, coated paper, metal, organic and inorganic composite surfaces and the like, including blends and laminates thereof.

In other embodiments, the substrate may be colored or opaque. It has been found that the composition provides easily cleanable surfaces to substrates such as flexible films used label applications. Flexible films may be made from polyesters such as PET or polyolefins such as PP (polypropylene), PE (polyethylene) and PVC (polyvinyl chloride). The substrate can be formed into a film using conventional filmmaking techniques such as extrusion of the substrate resin into a film and optional uniaxial or biaxial orientation of the extruded film. The substrate can be treated to improve adhesion between the substrate and the hardcoat coating, using, e.g., chemical treatment, corona treatment such as air or nitrogen corona, plasma, flame, or actinic radiation. If desired, an optional tie layer (not shown) can also be applied between the substrate and the hardcoat coating composition to increase the interlayer adhesion. The other major surface of the substrate 22 may also be treated using the above-described treatments to improve adhesion between the substrate and a (e.g. pressure sensitive) adhesive layer 18 temporarily covered by a release liner 20. Major surface 22 of substrate 15 of FIG. 2 may also comprise such adhesive and release liner layers. The substrate may be provided with graphics, such as words or symbols as known in the art.

In still other embodiments, the substrate can be a metal or have a metal surface (e.g., vapor deposited metals) such as aluminum or stainless steel.

In some embodiments, articles with an anti-fog surface are described. Illustrative articles include medical and non-medical protective eye wear including glasses, goggles, face masks, face shields, and respirators; as well as mirrors, motor vehicle windows, and windshields.

In some embodiments, articles with a rewritable surface are described. Illustrative articles include dry erase boards and films, file folders, labels, name tags, notebook covers and dividers, tabs for hanging files, etc.

Dry erase articles can further comprise such other optional components as frames, means for storing materials and tools such as writing instruments, erasers, cloths, note paper, etc., handles for carrying, protective covers, means for hanging on vertical surfaces, easels, etc.

In some embodiments, the (e.g. label dry erase film) articles can further comprise a (e.g. pressures sensitive) adhesive coating on the back of the substrate and a release liner.

In another embodiment, a method of using an article having a rewritable surface is described comprising providing an article comprising a substrate and a hydrolyzed and condensed hardcoat as described herein, and preferably a surface layer comprising a hydrophilic silane; writing on the rewritable surface layer with a (e.g. permanent or dry erase) marker; and removing the writing. In some embodiments, removing the writing comprises wiping the rewritable surface with an eraser, cloth or paper towel. Herein, "wiping" refers to gentle wiping, typically by hand, with for example, a tissue, paper towel, or a cloth, without significant pressure (e.g., generally, no more than 800 grams) for one or more strokes or rubs (typically, only a few are needed). In some embodiment, removing further comprises applying an aqueous cleaning solution optionally comprising organic solvent (s), to the rewritable surface layer. The aqueous cleaning solution may comprise cationic, anionic or/and nonionic surfactants as known in the art.

The rewritable surfaces of dry erase articles exhibit excellent writability with conventional dry erase markers and permanent markers. Significantly, permanent marker writing and ghosting can be easily removed from the hydrophilic silane surface layer by wiping with water.

The hardcoat layer described herein is also suitable for other articles such as coatings for (e.g. flexible) electronics including insulating layers (e.g. dielectric coatings) and protective coatings and films for various electronic components such as (e.g. LCD, LED, and OLED) display surfaces and lenses of cameras and sensors.

EXAMPLES

Unless otherwise noted or readily apparent from the context, all parts, percentages, ratios, etc. in the Examples and the rest of the specification are by weight.

Materials

| Abbreviation | Material |
| --- | --- |
| 1115 | Nalco 1115 colloidal silica, 4 nm, 15 wt % solids, pH 10.5, obtained from Nalco Water, Naperville, Illinois, USA |
| 1130 | Nalco 1130 colloidal silica, 8 nm, 30 wt % solids, pH 10.5, obtained from Nalco Water, Naperville, Illinois, USA |
| 2326 | Nalco 2326 colloidal silica, 5 nm, 15 wt % solids, pH 9, obtained from Nalco Water, Naperville, Illinois, USA |
| 2327 | Nalco 2327 colloidal silica, 20 nm, 40 wt % solids, pH 9 obtained from Nalco Water, Naperville, Illinois, USA |
| 2329 | Nalco 2329 colloidal silica, 80-100 nm, 40 wt % solids, pH 8.5, obtained from Nalco Water, Naperville, Illinois, USA |
| MTMS | Methyltrimethoxysilane, obtained from Gelest, Morrisville, Pennsylvania, USA |
| MTES | Methyltriethoxysilane, obtained from Gelest, Morrisville, Pennsylvania, USA |
| AA | Acetic acid, obtained from MilliporeSigma, Burlington, Massachusetts, USA |
| NA | Nitric acid, obtained from BDH Chemicals VWR, Radnor, Pennsylvania, USA |
| 1M2P | 1-Methoxy-2-propanol, obtained from Alfa Aesar, Ward Hill, Massachusetts, USA |
| LSS-35 | LSS-35 lithium silicate, 22 wt %, obtained from Nissan Chemical America Corporation, Houston, Texas, USA |
| Epoxy silane GPTMS | (3-Glycidoxypropyl)trimethoxysilane, MW = 236.34, d = 1.070, obtained from Gelest, Morrisville, Pennsylvania, USA |
| TEOS | Tetraethoxysilane, obtained from Aldrich |
| ZS | Zwitterionic silane, 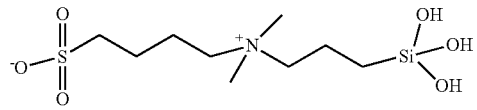 43 wt % in water, prepared as described in U.S. Pat. No. 5,936,703 |
| BYK-3500 | BYK-UV 3500, a polyether modified acryl functional polydimethylsiloxane surfactant, obtained from BYK USA Inc., Wallingford, Connecticut, USA |
| BYK-185 | DISPERBYK-185, a silicone surfactant solution of high molecular weight block copolymers with pigment affinic groups, obtained from BYK USA Inc., Wallingford, Connecticut, USA |
| MITSUBISHI film | Clear PET film with primer on both sides, obtained from MITSUBISHI POLYESTER FILM, Greer, South Carolina, USA |

Test Methods

Water Resistance, Mechanical Durability, and Permanent Marker Removal Test Method Water resistance test was conducted by immersing the samples into water for times from 3 hours to 48 hours. During the test, water was continuously removed and replenished to evaluate the water resistance.

After water soaking in water, the coating durability was evaluated by wet reciprocating abrasion test for 5000 cycles via TABER INDUSTRIES 5900 Reciprocating Abrader (North Tonawanda, New York, USA), under 15.0 Newtons. The speed of abrasion cycle is 75 cycles per minute. The testing stroke is 5.1 centimeter length long. The 2.5 centimeter button was covered by KIMBERLY-CLARK L30 or L40 WYPALL (Irving, Texas, USA) towel and an abrasion square cloth from TESTFABRICS Inc. (AATCC Crockmeter Standard Rubbing Cloth, West Pittson, Pennsylvania, USA), the square cloth (which touched the coating surface) was wetted by deionized water during the abrasion test. Durability score is reported as: 0 being best, no scratches at all; 5 being worst, badly scratched, coatings were peeling off.

After the wet abrasion test (no scratches), the abraded area was marked with a permanent marker (Sharpie black, Oak Brook, Illinois, USA), the permanent black Sharpie was aged on the surface for 60 hours. Permanent mark removal test was evaluated by gentle wipes with a wet Kimwipe tissue. Test samples were considered good if the sample tested areas showed scratch and permanent mark completely removed and ghosting free.

Anti-Fogging Test Method

Antifog test was conducted by immersing the film samples into water for an hour. The water was circulated by continuously replenishing fresh water. After water soaking, the film samples were dried overnight at ambient condition. The film samples were separately exposed to a water vapor generated by heating a 500 mL beaker of water at 60° C. for 1 minute and facing the film sample hydrophilic side down against a one-inch round hole of a glass cover placed over the beaker. A good antifogging sample remained clear after 1 minute.

PREPARATORY EXAMPLES

General Preparation Procedure for Polysiloxane Hardcoat Solution Containing Nanosilica—1130

Into a screw-capped jar was placed 1130 dispersion solution (30 wt % solids, 25 g). While the solution was stirred, to the dispersion solution was added acetic acid. MTES was added to the stirring solution and kept stirring vigorously for 24-72 hours at room temperature. 1-methoxy-2-propanol was then added to the solution. Different ratios of 1130 to MTES were utilized as shown in Table 1. The solutions contained 2 wt % of BYK-UV 3500 surfactant for improving the silicone hardcoat solution coatability on certain substrates. (0.02 gram of BYK-UV 3500 was added to each 10 grams of the solutions).

TABLE 1

Composition of the Polysiloxane Hardcoat Containing 1130

| | 1130:MTES | Reaction time | 1130, 30 wt % | Acetic acid | MTES | 1M2P |
|---|---|---|---|---|---|---|
| 1130-A | 1:3 | 24 hours | 25 grams | 1.25 grams | 22.5 grams | 17.5 grams |
| 1130-B | 1:5 | 24 hours | 25 grams | 1.25 grams | 37.5 grams | 17.5 grams |
| 1130-C | 1:7 | 72 hours | 25 grams | 1.25 grams | 52.5 grams | 17.5 grams |

General Preparation Procedure for Polysiloxane Hardcoat—2 Steps

1) Pre-Hydrolysis of Methyltriethoxysilane [MTES/H$_2$O(1/6)]

Into a cap-screwed jar was placed the desired amounts of MTES, 5 wt % acetic acid solution, and 1 wt % nitric acid, as indicated in Table 2. The molar ratio of MTES to water was 1 to 6 (per 50 grams of MTES, 30.288 grams of diluted acid), the solution was denoted by MTES/H$_2$O (1/6). The resulting MTES solution was stirred and the silane underwent hydrolysis at an ambient condition for times as indicated in the Table 2 forming silanol and oligomers.

TABLE 2

Composition of Condensed MTES Solution

| | Hydrolyzation time | MTES | 5 wt % Acetic acid | 1 wt % Nitric acid |
|---|---|---|---|---|
| MTES/H$_2$O(1/6)-6 hr | 6 hours | 50 grams | 28.774 grams | 1.514 grams |
| MTES/H$_2$O(1/6)-3 d | 3 days | 50 grams | 30.288 grams | N/A |

2) Preparation of (3-Glycidoxypropyl)Trimethoxysilane Modified 20 nm Sized 2327

(3-Glycidoxypropyl)trimethoxysilane (GPTMS) (5 grams) was added to the aqueous 2327 solution dispersion (250 grams, 40%) and the solution was stirred overnight in a screw-capped jar at 60° C. After reaction the GPTMS modified 2327 solution was cooled to room temperature, to the modified particle solution was added 1-methoxy-2-propanol (1M2P) (150 grams) while the solution was stirred. The final weight ratio of GPTMS:2327:1M2P was equal to 5:250:150. The final GPTMS modified 2327 (denoted by 2327-epoxy) was 25 wt % in water/1-methoxy-2-propanol mixed solution.

General Preparation Procedure for Polysiloxane Hardcoat Solution Containing 20 nm Sized Nanosilica—2327 (2327-A, 2327-B, 2327-C)

To prepare polysiloxane hardcoat solutions containing 2327 dispersion solution (40 wt % solids, 24 grams), into a screw-capped jar were placed the pre-hydrolyzed methyltriethoxysilane solution and (3-glycidoxypropyl)trimethoxysilane modified 2327 solution in weight ratios as shown in the Table 3 below. The solutions contained 2 wt % of BYK-UV 3500 surfactant for improving the silicone hardcoat solution coatability on certain substrates. (0.02 gram of BYK-UV 3500 was added to each grams of the solutions).

TABLE 3

Composition of Polysiloxane Hardcoat Containing 2327

| 2327:MTES wt-% solids | MTES/H$_2$O(1/6)-6 hr (weight of MTES) | 2327, 40 wt % |
|---|---|---|
| 2327-A 1:3 | 28.90 grams | 24 grams |
| 2327-B 1:5 | 48.17 grams | 24 grams |
| 2327-C 1:7 | 67.44 grams | 24 grams |

Preparation of Zwitteronic Silane/LSS-35 Hydrophilic Topcoat Aqueous Solution

Into a screw-capped jar were placed 18.46 grams of zwitterionic silane (45.5 wt %), 16.36 grams of LSS-75 (22 wt %) and 365.18 grams of deionized water. The weight ratio of the zwitterionic silane to LSS-75 in a ratio of 70:30, and the total weight percentage was 3 wt %. The hydrophilic top coating solution was denoted by 3% ZS/LSS(70/30).

Preparation of Zwitterionic Silane Topcoat Aqueous Solution

To an aqueous solution of 26.37 grams of zwitterionic silane (45.5 wt %) was added 373.63 grams of deionized water to dilute the silane solution to a 3 wt % aqueous solution denoted by 3% ZS.

Preparation of Hydrophilic Silicone Hardcoat Film—Method I

The respective polysiloxane hardcoat solution was coated on Mitsubishi Film via Mayer Rod #12, the resulting coating was thermally cured at 140° C. for 5 minutes. The dried hardcoat had a thickness between 3 and 4 microns. The cured silicone hardcoat was corona-treated by ETP BD-20AC LABORATORY CORONA TREATER (Electro-Technic Products, Chicago, IL, USA). Subsequently, the above prepared 3% ZS/LSS(70/30), was coated on the corona-treated polysiloxane hardcoat via Mayer Rod #3, and dried at 140° C. for 5 minutes. The dried surface layer thickness was between 0.5 and 1 microns.

Preparation of Hydrophilic Silicone Hardcoat Film—Method II

The respective polysiloxane hardcoat solution was coated on Mitsubishi Film via Mayer Rod #12, the resulting coating was thermally cured at 140° C. for 5 minutes. The dried hardcoat had a thickness between 3 and 4 microns. The cured silicone hardcoat was corona-treated by ETP BD-20AC LABORATORY CORONA TREATER Subsequently the above prepared 3% ZS, was coated on the corona treated polysiloxane hardcoat via Mayer Rod #3, and dried at 140° C. for 5 minutes. The dried surface layer thickness was between 0.5 and 1 microns.

Preparation of Hydrophilic Silicone Hardcoat Film—Method III

Film coating rolls were prepared by YASUI SEIKI conventional roller coater (YS coater) (Bloomington, IN, USA) with a 6-inches wide die. The corona treater was obtained from Pillar Technologies, Hartland, Wisconsin, USA, having a 7-inches wide with nitrogen purged. The coating parameters are shown in Table 4.

The polysiloxane hardcoat was coated and cured through the YS coater, the hydrophilic top layer was coated and cured through the YS coater over the nitrogen corona treated polysiloxane hardcoat.

TABLE 4

YASUI SEIKI conventional roll coater coating parameters

| Coating | Gravure Roll # | Line speed, ft/min | Oven temperature | Corona treatment, J/cm$^2$ |
|---|---|---|---|---|
| Polysiloxane hardcoat | 30 | 3 | 140° C. | |
| Hydrophilic top layer | 70 | 5 | 140° C. | 25.83 or 38.75 |

EXAMPLES

EX-1 to 3

As described in Table 1, polysiloxane solutions 1130-A, 1130-B and 1130-C were coated on Mitsubishi PET film separately with a 12# Meyer bar and were thermally cured for 5 minutes. The samples were corona-treated and subsequently were topcoated with the zwitterionic silane/LSS-35 hydrophilic solutions as indicated in Table 5 and dried at 140° C. for 5 minutes. The example films were separately evaluated based on their mechanical durability and Sharpie removability performance all on the same test spot

TABLE 5

Examples EX-1 to 3 Films Test Results

| | Polysiloxane hardcoat | Hydrophilic top layer | After 3 hours soak Durable? | Ink removal | After 5 hours soak Durable? | Ink removal | After overnight soak Durable? | Ink removal |
|---|---|---|---|---|---|---|---|---|
| EX-1 | 1130-A | 3% ZS/LSS (70/30) | 0* | Good | 0 | Good | 0 | Good |
| EX-2 | 1130-B | 3% ZS/LSS (70/30) | 0 | Good | 0 | Good | 0 | Good |
| EX-3 | 1130-C | 3% ZS/LSS (70/30) | 0 | Good | 0 | Good | 0 | Good |

Examples EX-4 to 6

Examples were the same as described in examples EX-1 to 3 except that the hydrophilic topcoat was 3 wt % ZS aqueous solution.

TABLE 6

Example 4 to 6 Film Test Results

| | Polysiloxane hardcoat | Hydrophilic top layer | After 3 hours soak Durable? | Ink removal | After 5 hours soak Durable? | Ink removal | After overnight soak Durable? | Ink removal |
|---|---|---|---|---|---|---|---|---|
| EX-4 | 1130-A | 3% ZS | 0 | Good | 0 | Good | 0 | Good |
| EX-5 | 1130-B | 3% ZS | 0 | Good | 0 | Good | 0 | Good |
| EX-6 | 1130-C | 3% ZS | 0 | Good | 0 | Good | 0 | Good |

Examples EX-1 to 3 films showed easy-removal of Sharpie marks by gentle wipes with a wet Kimwipe tissue when compared with examples EX-4 to 6.

Examples EX-7 to 9

As described in Table 3, polysiloxane solutions 2327-A, 2327-B and 2327-C were coated on Mitsubishi PET film separately with a 12# Meyer bar and were thermally cured for 5 minutes. The samples were corona-treated and subsequently were topcoated with the zwitterionic silane/LSS-35 hydrophilic solution (Method I) as indicated in Table 7 and dried at 140° C. for 5 minutes. The example films were separately evaluated based on the above test methods on their mechanical durability and Sharpie removability performance.

TABLE 7

Examples EX-7 to 9 Films Test Results (Two-step process)

| | Polysiloxane hardcoat | Hydrophilic top layer | After 3 hours soak Durable? | After 3 hours soak Ink removal | After 5 hours soak Durable? | After 5 hours soak Ink removal | After overnight soak Durable? | After overnight soak Ink removal |
|---|---|---|---|---|---|---|---|---|
| EX-7 | 2327-A | 3% ZS/LSS (70/30) | 0* | Good | 0 | Good | 0 | Good |
| EX-8 | 2327-B | 3% ZS/LSS (70/30) | 0 | Good | 0 | Good | 0 | Good |
| EX-9 | 2327-C | 3% ZS/LSS (70/30) | 0 | Good | 0 | Good | 0 | Good |

Examples EX-10 to 12

The examples were the same as described in examples EX-7 to 9 except that the hydrophilic topcoat was 3 wt % ZS aqueous solution.

TABLE 8

Examples EX-7 to 9 Films Test Results

| | Polysiloxane hardcoat | Hydrophilic top layer | After 3 hours soak Durable? | After 3 hours soak Ink removal | After 5 hours soak Durable? | After 5 hours soak Ink removal | After overnight soak Durable? | After overnight soak Ink removal |
|---|---|---|---|---|---|---|---|---|
| EX-10 | 2327-A | 3% ZS | 0* | Good | 0 | Good | 0 | Good |
| EX-11 | 2327-B | 3% ZS | 0 | Good | 0 | Good | 0 | Good |
| EX-12 | 2327-C | 3% ZS | 0 | Good | 0 | Good | 0 | Good |

Anti-Fogging Experiments of Example EX-1(D) to EX-3(D) and EX-7(D) to EX-9(D)

The polysiloxane hardcoats of EX-1 to 3 and EX-7 to 9 were prepared by the addition of DISPERBYK-185 surfactant (0.01 gram surfactant per 10 grams of solution) instead of BYK-UV 3500, labeled EX-1(D) to EX-3(D) and EX-7 (D) to EX-9(D). Example EX-1(D) to EX-3(D) and EX-7(D) to EX-9(D) films were evaluated by the method described in Anti-fogging Test Method. Control film was Mitsubishi PET film (without any coatings). Control film had fogging instantly when placed against the 60° C. warm water vapor, examples EX-1(D) to EX-3(D) and EX-7(D) to EX-9(D) films were kept optically clear, no fogging was formed.

TABLE 9

Anti-fogging Evaluation of Films

| Name | Anti-Fogging |
|---|---|
| Control | No |
| EX-1(D) | Good |
| EX-2(D) | Good |
| EX-3(D) | Good |
| EX-7(D) | Good |
| EX-8(D) | Good |
| EX-9(D) | Good |

Examples EX-13 to 16

Polysiloxane hardcoat solutions 1130-B and 2327-B were coated on 4 mil Mitsubishi PET by YS coater at a line speed of 3 feet/min. and cured at 140° C. by Method III described above. The coated hardcoats were nitrogen corona-treated under 1.0 Kilowatts (25.83 J/cm$^2$) or 1.5 Kilowatts (38.75 J/cm$^2$), subsequently the treated sides were coated with a 3 wt % ZW/LSS hydrophilic solution at a speed of 5 feet/minute and dried at 120° C.

TABLE 10

Example EX-13 to 16 Films Test Results

| | Polysiloxane hardcoat | Hydrophilic top layer | Corona treatment, J/cm$^2$ | After 72 hour soak Durability | After 72 hour soak Ink-removal |
|---|---|---|---|---|---|
| EX-13 | 1130-B | 3% ZS/LSS(70/30) | 25.83 | 0 | Good |
| EX-14 | 1130-B | 3% ZS/LSS(70/30) | 38.75 | 0 | Good |
| EX-15 | 2327-B | 3% ZS/LSS(70/30) | 25.83 | 0 | Good |
| EX-16 | 2327-B | 3% ZS/LSS(70/30) | 38.75 | 0 | Good |

Examples EX-17 to 24

Coating solutions containing 1130 were prepared via a one-step procedure. 1130 and MTES were stirred for 24-72 hours under acidic environment (acetic acid). Weight ratios between particle and silane were 1 to 3, 1 to 5 and 1 to 7 with optional 5% GPTMS or 10% C16 silane. Polysiloxane hardcoat solutions were coated on 4 mil Mitsubishi PET by YS coater at a line speed of 3 feet/min. and cured at 140° C. by Method III described above. The coated hardcoats were nitrogen corona-treated under 1.0 Kilowatts (25.83 J/cm$^2$) or 1.5 Kilowatts (38.75 J/cm$^2$), subsequently the treated sides were coated with a 3 wt % ZW/LSS hydrophilic solution at a speed of 5 feet/minute and dried at 120° C. The example films were separately evaluated based on their mechanical durability (2000 cycles, rather than 5000 cycles) and Sharpie removability performance.

1130:MTES (1:7) with 5% GPTMS was more viscous and started to gel after two months; 1130:MTES (1:7) and 1130:MTES (1:7) with 10% C16 silane turned more noticeable viscous after two months as well.

TABLE 11

Examples EX-17 to 24 Films Test Results

| | Composition | After one week | | After two weeks | | After one month | | After two months | |
|---|---|---|---|---|---|---|---|---|---|
| | | Durable? | Ink removal | Durable? | Ink removal | Durable? | Ink removal | Durable? | Ink removal |
| EX-17 | 1130:MTES = 1:3 | 0 | Good | 1 | Good | 0 | Good | 0 | Good |
| EX-18 | 1130:MTES = 1:3 and 5% GPTMS | 0 | very slightly ghosting | 0 | very slightly ghosting | 1 | Good | 0 | Good |
| EX-19 | 1130:MTES = 1:5 | 0 | Good | 0-1 | tiny ghost | 0-1 | Good | 0-1 | Good |
| EX-20 | 1130:MTES = 1:5 and 5% GPTMS | 0 | Good | 0 | Good | 1 | Good | 0-1 | Good |
| EX-21 | 1130:MTES = 1:5 and 10% C16 silane | 0 | Good (easier) | 0 | Good (easier) | 0 | Good (easier) | 1 | Good |
| EX-22 | 1130:MTES = 1:7 | 0 | very slightly ghosting | 0-1 | Good | 1 | Good | 0* | Good |
| EX-23 | 1130:MTES = 1:7 and 5% GPTMS | 0 | very slightly ghosting | 0 | Good | 0 | Good | 0* | Good |
| EX-24 | 1130:MTES = 1:7 and 10% C16 silane | 0 | Good (easier) | 0 | Good (easier) | 0 | Good (easier) | 1-2* | Good |

Examples EX-25 to 28

The coating solutions containing 2327 were prepared via a two-step procedure. MTES was hydrolyzed for 5 hours (with the addition of nitric acid "NA") or 3 days (without NA), then mixed with GPTMS modified 2327 in 1-methoxy-2-propanol. Weight ratios between particle and silane were 1 to 3, 1 to 5 and 1 to 7. Polysiloxane hardcoat solutions were coated on 4 mil Mitsubishi PET by YS coater at a line speed of 3 feet/min. and cured at 140° C. by Method III described above. The coated hardcoats were nitrogen corona-treated under 1.0 Kilowatts (25.83 J/cm$^2$) or 1.5 Kilowatts (38.75 J/cm$^2$), subsequently the treated sides were coated with a 3 wt % ZW/LSS hydrophilic solution at a speed of 5 feet/minute and dried at 120° C. The example films were separately evaluated based on their mechanical durability (2000 cycles, rather than 5000 cycles) and Sharpie removability performance.

TABLE 13

Examples EX-25 to 28 Films Test Results

| | Composition | After 10 days | | After two months | | After three months | |
|---|---|---|---|---|---|---|---|
| | | Durable? | Ink removal | Durable? | Ink removal | Durable? | Ink removal |
| EX-25 | 2327:MTES = 1:3* with AA | 0* | Very tiny ghost | 0 | Good | 0-1 | Good |
| EX-26 | 2327:MTES = 1:5* with AA | 0 | Good | 0 | Good | 0 | Good |

TABLE 13-continued

Examples EX-25 to 28 Films Test Results

|  |  | After 10 days | | After two months | | After three months | |
|---|---|---|---|---|---|---|---|
|  | Composition | Durable? | Ink removal | Durable? | Ink removal | Durable? | Ink removal |
| EX-27 | 2327:MTES = 1:7* with AA | 0 | Good | 0 | Good | 0-1 | Good |
| EX-28 | 2327:MTES = 1:3 with AA and NA | 0-1 | Ghost | 1 | very tiny ghost | 1-2 | some ghost |

Smaller particles work without surface modification, but modification is still preferred for stability especially for higher concentrations.

Examples EX-29 to 38

This set of examples were prepared by similar methods to those above and exhibited similar durability and ink removal as the previous examples. However, when the hydrophilic silane is present, the permanent marker can more easily be removed with water. Some of examples 29 to 38 exhibited dewetting. Surface treating the particle would rectify the dewetting problem.

TABLE 14

Examples EX-29 to 38 Films Test Results (No hydrophilic silane)

| Example | Formulation |
|---|---|
| EX-29 | MTMS/1130 = 3/1, AA |
| EX-30 | MTMS/1130 = 5/1, AA |
| EX-31 | MTMS/1130 = 7/1, AA |
| EX-32 | MTMS/2327 = 5/1, AA |
| EX-33 | MTMS/1115 = 5/1, AA |
| EX-34 | MTMS/2326 = 5/1, AA |
| EX-35 | MTMS/2329 = 5/1, AA |
| EX-36 | MTMS/GPTMS/1130 = 4.5/0.5/1, AA |
| EX-37 | MTMS/GPTMS/1130 = 4/1/1, AA |
| EX-38 | MTMS/GPTMS/1130 = 3/2/1, AA |

Examples EX-39 to EX-42

NALCO 1130 dispersion solution (30 wt %, 100 g) was weighed in a glass jar. To the dispersion was added acetic acid to adjust the pH to between 5 and 6 while the solution was stirred vigorously using a magnetic stirrer. Subsequently, the methyltrimethoxy silane was added to the stirring solution the mixture was allowed to hydrolyze for 24-72 hrs. After the reaction was complete, 1-methoxy-2-propanol was added into the reacted solution and the solution was divided into three parts. One part of the solution remained as it was while 1 wt % and 2 wt % surfactant (BYK-UV-3500) was added to the other two parts. The resulting siloxane hardcoat solutions were coated on PET substrates and dried at 140° C. for 10-15 minutes. The cured hardcoat surfaces were circled with a variety of Dry Erase and Permanent Markers separately and the pen marks subsequently aged at 50° C. for 24 hours before mark removal test.

TABLE 15

Siloxane hardcoat solution compositions

| Sample | Reaction Time | Nalco 1130, (30 wt %) | MTMS | Acetic acid | 1M2P |
|---|---|---|---|---|---|
| EX-39 | 24 hours | 25 g | 17.2 g | 1.25 g | 17.5 g |
| EX-40 | 24 hours | 25 g | 23 g | 1.25 g | 17.5 g |
| EX-41 | 24 hours | 25 g | 28.7 g | 1.25 g | 17.5 g |
| EX-42 | 24 hours | 25 g | 36.1 g | 1.25 g | 17.5 g |

TABLE 16

Removal of Dry Erase Markers and Permanent on siloxane hardcoat (without surfactant)

|  | Dry Erase Marker | | | | Sharpie Marker | | |
|---|---|---|---|---|---|---|---|
| Sample | Green | Red | Blue | Black | Red | Blue | Black |
| EX-39 | Easily erased | Easily erased | Easily erased | Easily erased | Erased with a force | Erased with a force | Erased with a force |
| Number of strokes to erase ink | 1 | 1 | 1 | 1 | 20 | 22 | 13 |
| EX-40 | Easily erased | Easily erased | Easily erased | Easily erased | Erased with a force | Erased with a force | Erased with a force |
| Number of strokes to erase ink | 1 | 1 | 2 | 1 | 19 | 17 | 12 |
| EX-41 | Easily erased | Easily erased | Easily erased | Easily erased | Erased with a force | Erased with a force | Erased with a force |
| Number of strokes to erase ink | 1 | 1 | 1 | 1 | 8 | 10 | 12 |
| EX-42 | Easily erased | Easily erased | Easily erased | Easily erased | Erased with a force | Erased with a force | Erased with a force |

TABLE 16-continued

Removal of Dry Erase Markers and Permanent on siloxane hardcoat (without surfactant)

| Sample | Dry Erase Marker | | | | Sharpie Marker | | |
|---|---|---|---|---|---|---|---|
| | Green | Red | Blue | Black | Red | Blue | Black |
| Number of strokes to erase ink | 1 | 1 | 1 | 1 | 12 | 12 | 7 |

TABLE 17

Siloxane hardcoat solution compositions with 1 wt % surfactant

| Sample | Reaction Time | 1130, 30% | MTMS | Acetic acid | 1M2P | BYK-3500 |
|---|---|---|---|---|---|---|
| EX-43 | 24 hours | 25 g | 17.2 g | 1.25 g | 17.5 g | 0.6 g |
| EX-44 | 24 hours | 25 g | 23 g | 1.25 g | 17.5 g | 0.7 g |
| EX-45 | 24 hours | 25 g | 28.7 g | 1.25 g | 17.5 g | 0.7 g |
| EX-46 | 24 hours | 25 g | 36.1 g | 1.25 g | 17.5 g | 0.8 g |

TABLE 18

Removal of Dry Erase Markers and Permanent on siloxane hardcoat (contains 1 wt % surfactant)

| Sample | Dry Erase Marker | | | | Sharpie Marker | | |
|---|---|---|---|---|---|---|---|
| | Green | Red | Blue | Black | Red | Blue | Black |
| EX-43 | Easily erased | Easily erased | Easily erased | Easily erased | Easily erased | Easily erased | Easily erased |
| Number of strokes to erase ink | 1 | 1 | 1 | 1 | 1 | 1 | 1 |
| EX-44 | Easily erased | Easily erased | Easily erased | Easily erased | Easily erased | Easily erased | Easily erased |
| Number of strokes to erase ink | 1 | 1 | 1 | 1 | 2 | 2 | 2 |
| EX-45 | Easily erased | Easily erased | Easily erased | Easily erased | Easily erased | Easily erased | Easily erased |
| Number of strokes to erase ink | 1 | 1 | 1 | 1 | 1 | 1 | 1 |
| EX-46 | Easily erased | Easily erased | Easily erased | Easily erased | Easily erased | Easily erased | Easily erased |
| Number of strokes to erase ink | 1 | 1 | 1 | 1 | 3 | 1 | 2 |

TABLE 19

Siloxane hardcoat solution compositions with 2 wt. % surfactant

| Sample | Reaction Time | 1130, 30% | MTMS | Acetic acid | 1M2P | BYK-3500 |
|---|---|---|---|---|---|---|
| EX-47 | 24 hours | 25 g | 17.2 g | 1.25 g | 17.5 g | 1.2 g |
| EX-48 | 24 hours | 25 g | 23 g | 1.25 g | 17.5 g | 1.4 g |
| EX-49 | 24 hours | 25 g | 28.7 g | 1.25 g | 17.5 g | 1.5 g |
| EX-50 | 24 hours | 25 g | 36.1 g | 1.25 g | 17.5 g | 1.6 g |

TABLE 20

Removal of Dry Erase Markers and Permanent on siloxane hardcoat (contains 2 wt % surfactant)

| Sample | Dry Erase Marker | | | | Sharpie Marker | | |
|---|---|---|---|---|---|---|---|
| | Green | Red | Blue | Black | Red | Blue | Black |
| EX-47 | Easily erased | Easily erased | Easily erased | Easily erased | Easily erased | Easily erased | Easily erased |

TABLE 20-continued

Removal of Dry Erase Markers and Permanent on siloxane hardcoat (contains 2 wt % surfactant)

| Sample | Dry Erase Marker | | | | Sharpie Marker | | |
|---|---|---|---|---|---|---|---|
| | Green | Red | Blue | Black | Red | Blue | Black |
| Number of strokes to erase ink | 1 | 1 | 1 | 1 | 3 | 3 | 3 |
| EX-48 | Easily erased | Easily erased | Easily erased | Easily erased | Easily erased | Easily erased | Easily erased |
| Number of strokes to erase ink | 1 | 1 | 1 | 1 | 3 | 2 | 2 |
| EX-49 | Easily erased | Easily erased | Easily erased | Easily erased | Easily erased | Easily erased | Easily erased |
| Number of strokes to erase ink | 1 | 1 | 1 | 1 | 3 | 1 | 1 |
| EX-50 | Easily erased | Easily erased | Easily erased | Easily erased | Easily erased | Easily erased | Easily erased |
| Number of strokes to erase ink | 1 | 1 | 1 | 1 | 2 | 2 | 2 |

Comparative Example Sample Preparation

CE-1: A small glass bottle with magnetic stir bar was charged with methyltrimethoxysilane (4 g) and ethanol (16 g) and the solution was set stirring. To the solution was added DI water (0.4 g) and acetic acid to bring the pH of the solution to between 5 and 6. The solution was allowed to stir for 24 hours to complete the hydrolysis. The resulting hydrolysis solution was coated on a PET substrate and dried at 140° C. for 10 minutes. The cured coating surface was unevenly coated with many defects. The cured coating surface was marked with different Dry Erase pens and Permanent Markers pens. After the inks were dried at room temperature, the marks were removed with a paper towel.

CE-2: A small glass bottle with magnetic stir bar was charged with methyltrimethoxysilane (2.8 g), tetraethoxysilane (TEOS) (1.2) and ethanol (16 g) and the solution was set stirring. To the solution was added DI water (0.4 g) and acetic acid to bring the pH of the solution to between 5 and 6. The solution was allowed to stir for 24 hours to complete the hydrolysis. The resulting hydrolysis solution was coated on a PET substrate and dried at 140° C. for 10 minutes. The cured coating surface was unevenly coated with many defects. The cured coating surface was marked with different Dry Erase pens and Permanent Markers pens. After the inks were dried at room temperature, the marks were removed with a paper towel.

TABLE 21

Coating durability test & Ink removable test results

| Sample | Dry Erase Marker | | | | Sharpie Marker | | |
|---|---|---|---|---|---|---|---|
| | Green | Red | Blue | Black | Red | Blue | Black |
| CE-1 | Easily erased | Easily erased | Easily erased | Easily erased | Erased with a force - coating scratched | Erased with a force - coating scratched | Erased with a force - coating scratched |
| Number of strokes to erase ink | 1 | 1 | 1 | 1 | After 11-15 rubs | After 20-23 rubs | After 13-17 rubs |
| CE-2 | Easily erased | Easily erased | Easily erased | Easily erased | Erased with a force - coating scratched | Erased with a force - coating scratched | Erased with a force - coating scratched |
| Number of strokes to erase ink | 2 | 2 | 2 | 2 | After 12-17 rubs | After 27-31 rubs | After 18-22 rubs |

EX-51 to EX-56

Solution Preparation:

Into the 1130-B solution (with 1 wt % BYK-UV 3500), micron-size polymeric matte particles were added at 2 wt %-5 wt % of the total hardcoat solids concentration. Then, the solution was stirred vigorously using shear mixer to assist dispersion of the matting agent in the hardcoat solution.

The samples described in Table 22 were coated on a 4 mil Mitsubishi PET film using the reverse gravure coater to provide a dried and cured hardcoat thickness of 3.5-4 μm, corona treated, followed by topcoated with the zwitterionic silane/LSS-75 (4/6, wt %/wt %) hydrophilic solution. All the polymeric matting agents were added at 5 wt % of the hardcoat solids. The sample films were evaluated for Sharpie marker erasabilty with water.

TABLE 22

Sharpie permanent marker erasability with water for the matte samples containing different size of polymeric matting agents.

| | Matte Particles | Matting agent description | Permanent marker erasability |
|---|---|---|---|
| EX-51 | PM-200 (Mitsui Chemicals) | 10 µm PE bends | Heavy ghosting |
| EX-52 | SBP-8 (Sekisui Kasei) | 8 µm PS beads | Heavy ghosting |
| EX-53 | SBX-6 (Sekisui Kasei) | 6 µm PS beads | Slight ghosting |
| EX-54 | MB30X-5(Sekisui Kasei) | 5 µm PMMA beads | Slight ghosting |
| EX-55 | MB30X-3 (Sekisui Kasei) | 3 µm PMMA beads | No ghosting |
| EX-56 | SSX-3(Sekisui Kasei) | 3 µm PS beads | No ghosting |

EX-57 to EX-58

Into the 1130-B solution (with 1 wt % BYK-UV 3500), different concentration of 3 µm PMMA beads were added from 3 wt %-5 wt % of the total solids of the hardcoat solution. Then, the solution was stirred vigorously using shear mixer to assist dispersion of the matting agent in the hardcoat solution. The resulting solutions were coated using reverse gravure coater, corona treated, and finally coated with zwitterionic silane/LSS-75 hydrophilic solution. The dry erase performance was analyzed for the matte samples, where 12 of the most commonly used dry erase markers with different brands and colors were selected to evaluate the samples. The samples were cut into sheets with a size of 30 cm×50 cm, and each marker was used to draw a ~20 cm line and 12 different marker lines were aligned vertically on each sample. The samples were then put into an oven at 120 F for 48 h in order to mimic the aging of the marker at ambient temperature for at least 6 months. Finally, an Expo marker eraser were used to test the dry erasability of different markers. Each line was erased with 10 passes of the Expo marker eraser under a weight of 2.4 kg. The number of the passes was recorded when each marker when completely removed. Higher total score (max is 120) is correlated with poorer performance.

Table 23 indicates that the dry erase performance of the sample decreases with decreasing gloss values. Higher concentration of matting agents increased sample roughness and thereby impairing the marker dry removability as more ink was trapped at the valleys of the surface. The samples containing 3 wt. % of MB30X-3 matting agents demonstrated comparable dry erase performance to a glossy product (with a score of 43/120) while maintaining the low glare functionality with a gloss of 53. Decreasing the gloss by 10 significantly reduced the dry eraser removability and increased the total score to 90/120. Typically, the dry erase performance is at least 40 and less than 90, 80 or 70.

TABLE 23

Comparison of dry erase performance of matte samples under 12 different dry erase markers

| | EX-57<br>1130-B + 3 wt %<br>MB30X-3<br>(gloss 53) | EX-58<br>1130-B + 5 wt %<br>MB30X-3<br>(gloss 43)' |
|---|---|---|
| Quartet Enduraglide Black | 4 | 4 |
| Quartet Enduraglide Blue | 10 | 10 |
| BIC Magic Marker Black | 6 | 10 |
| BIC Magic Marker Red | 10 | 10 |
| Staples Remarx Black | 2 | 2 |
| Staples Remarx Red | 1 | 2 |
| Expo Low Odor Black | 10 | 10 |
| Expo Low Odor Red | 1 | 2 |
| BIC Intensity Black | 3 | 10 |
| BIC Intensity Blue | 2 | 10 |
| Amazon Basics Black | 10 | 10 |
| Amazon Basics Red | 10 | 10 |
| Total score | 67 | 90 |

EX-59 to EX-61

3 wt % of 3 µm polystyrene beads (SSX-3) were charged into the 1130-B hardcoat solution containing 1 wt % of BYK-UV3500. The resulting solution was stirred vigorously using shear mixer and was coated with reverse gravure coater line with a thickness of 3.5-4 µm. Then, the hardcoat was activated using different levels of corona treatment using the Universal Treater line with energy dosage from 4-12 J/cm$^2$. Finally, silane topcoat was coated immediately on the corona treated hardcoat utilizing the same reverse gravure coater. The permanent erasability of the samples were analyzed using a Taber Abraser instrument with a microfiber cloth attachment. The samples were soaked in deionized water overnight followed by aging at 120 F for 1 h prior to the analysis. Each sample went through up to 6 rounds (10 cycles for each round, with each cycle corresponds to one back-and-forth movement of the Taber Abraser head) of testing using a wet microfiber cloth with a weight of 1.5 kg to remove 6 different permanent marker inks. In addition, the durability of the samples was evaluated by using Taber Abraser with a 2 kg weight to abrade the sample covered with black Expo dry erase marker ink for up to 6 rounds (400 cycles for each round, with each cycle corresponds to one back-and-forth movement of the Taber Abraser head). Kleenex tissue paper was applied to the abraser head to serve as the dry abrasion medium. After each round, the functionality of the coating was accessed using permanent marker and water. Higher scores mean better performance for both the erasability and durability testing.

As shown in Table 24, all the matte samples demonstrated high erasability score with almost 100% permanent marker removal after up to 6×10 cycles of testing. In addition, all of the matte samples maintained their excellent functionality even after 2400 cycles of abrasion, which demonstrates the matte hardcoat provides strong support for the silane topcoat and effectively prevented it from delaminating.

TABLE 24

Permanent marker erasability and durability of the matte sample and current FWS product

| Sample | Corona energy | Average erasability score (max 30) | Ink remaining | Average abrasion score (max 6) |
|---|---|---|---|---|
| EX-59<br>1130-B solution + | 4 J/cm$^2$ | 25 | 0% | 6 |

TABLE 24-continued

Permanent marker erasability and durability of the matte sample and current FWS product

| Sample | Corona energy | Average erasability score (max 30) | Ink remaining | Average abrasion score (max 6) |
|---|---|---|---|---|
| 1 wt % BYK-UV 3500, 3 wt % SSX-3 EX-60 1130-B solution + 1 wt % BYK-UV 3500, 3 wt % SSX-3 | 12 J/cm$^2$ | 22 | 0.5% | 6 |
| EX-61 1130-B solution + 1 wt % BYK-UV 3500, 3 wt % SSX-3 | 8 J/cm$^2$ | 22 | 1% | 6 |

What is claimed is:

1. An article comprising:
   A) a substrate;
   B) a hardcoat layer disposed on the substrate wherein the hardcoat layer comprises the hydrolyzed and condensed reaction product of a composition comprising:
      i) first hydrophobic silane monomer(s) having the formula $R^1Si(OR)_3$ wherein R and $R^1$ is methyl or ethyl;
      ii) optional second silane monomer(s) having the formula $(R^2)_{4-m}Si(OR)_m$ or $Si(OR)_4$
      wherein R, $R^1$ and $R^2$ are organic groups with the proviso that $R^2$ is not methyl or ethyl and m ranges from 1 to 3;
      wherein when present, the second silane monomer(s) is present in an amount less than 20 wt. % based on the sum of first and second silane monomers;
      iii) optionally 10 to 30 wt. % silica nanoparticles;
   C) a surface layer comprising a hydrophilic silane disposed on the hardcoat layer.

2. The article of claim 1 wherein said hydrophilic silane comprises a zwitterionic silane.

3. The article of claim 2 wherein the surface layer further comprises lithium silicate, sodium silicate, potassium silicate, or combinations thereof.

4. The article of claim 1 wherein the hardcoat layer comprises silica nanoparticles have an average primary particle size of less than 25, 15, or 10 nm.

5. The article of claim 1 wherein the first silane monomer(s) is present in at amount of at least 85, 90, or 95 wt. % based on the sum of first and second silane monomers.

6. The article of claim 1 wherein the hardcoat layer comprises silica nanoparticles that comprise a hydrophilic silane surface treatment.

7. The article of claim 6 wherein the hydrophilic silane surface treatment is an epoxy alkoxy silane.

8. The article of claim 1 wherein the substrate comprises an organic polymeric material.

9. The article of claim 1 wherein the surface layer is a rewritable surface.

10. The article of claim 9 wherein the article is a dry erase board or film, label, file folder, file tab, or notebook cover or divider.

11. A method of using an article having a rewritable surface comprising:
    providing an article according to claim 1;
    writing on the rewritable surface layer with a marker; and
    removing the writing.

12. The method of claim 11 wherein said hydrophilic silane comprises a zwitterionic silane.

13. The method of claim 11 wherein the surface layer further comprises lithium silicate, sodium silicate, potassium silicate, or combinations thereof.

14. The method of claim 11 wherein the hardcoat layer comprises silica nanoparticles have an average primary particle size of less than 25, 15, or 10 nm.

15. The method of claim 11 wherein the first silane monomer(s) is present in at amount of at least 85, 90, or 95 wt. % based on the sum of first and second silane monomers.

16. The method of claim 11 wherein the hardcoat layer comprises silica nanoparticles that comprise a hydrophilic silane surface treatment.

17. The method of claim 16 wherein the hydrophilic silane surface treatment is an epoxy alkoxy silane.

18. The method of claim 11 wherein the substrate comprises an organic polymeric material.

19. The method of claim 11 wherein the surface layer is a rewritable surface.

20. The method of claim 19 wherein the article is a dry erase board or film, label, file folder, file tab, or notebook cover or divider.

21. The method of claim 11 wherein the marker is a permanent marker.

22. The method of claim 11 wherein removing the writing comprises wiping the rewritable surface with a dry eraser, dry cloth or dry paper towel.

* * * * *